THERMALLY DISSOCIATIVE GAS POWER CONVERSION CYCLE

Filed Oct. 19, 1965 5 Sheets-Sheet 1

KENNETH P JOHNSON
*INVENTOR.*

BY Edward O Ansell ATTORNEY
Albert J Miller AGENT

KENNETH P JOHNSON
*INVENTOR.*

BY Edward O Ansell ATTORNEY

Albert J Miller AGENT

THERMALLY DISSOCIATIVE GAS POWER CONVERSION CYCLE

Filed Oct. 19, 1965 5 Sheets-Sheet 3

KENNETH P JOHNSON
*INVENTOR.*

BY Edward O Ansell
ATTORNEY

Albert J Miller AGENT

THERMALLY DISSOCIATIVE GAS POWER CONVERSION CYCLE

Filed Oct. 19, 1965 5 Sheets-Sheet 4

KENNETH P JOHNSON
*INVENTOR.*

BY Edward O Ansell
ATTORNEY
Albert J Miller AGENT

THERMALLY DISSOCIATIVE GAS POWER CONVERSION CYCLE

Filed Oct. 19, 1965 5 Sheets-Sheet 5

KENNETH P JOHNSON
*INVENTOR.*

BY Edward O Ansell
ATTORNEY

Albert J. Miller AGENT

United States Patent Office 3,370,420
Patented Feb. 27, 1968

3,370,420

THERMALLY DISSOCIATIVE GAS POWER CONVERSION CYCLE

Kenneth P. Johnson, Walnut Creek, Calif., assignor to Aerojet-General Corporation, El Monte, Calif., a corporation of Ohio Filed Oct. 19, 1965, Ser. No. 497,616
10 Claims. (Cl. 60—36)

ABSTRACT OF THE DISCLOSURE

A thermally dissociative gas power cycle having a reversibly thermally dissociative gaseous working fluid in a closed cycle. Within the closed cycle, the working fluid flows progressively through a pressurizing means for exerting pressure on the fluid, a recuperator heat exchanger to heat the fluid, a heat source to further heat the fluid, a heat engine for the conversion of energy, back through the recuperator heat exchanger to give off excess retained heat, then to a precooler heat exchanger to allow further cooling of the fluid and return to the pressurizing means to complete the closed cycle.

This invention relates to thermodynamic working fluids generally and more particularly to the use of closed-cycle thermodynamic working fluids which thermally dissociate in the gas phase upon heating and reversibly recombine in the gas phase upon cooling.

There have been countless ways and means devised to achieve improvements in the overall thermodynamic efficiency of power plants. Some means relate to ways of increasing the work output, others to ways of decreasing work or heat input, and still others to ways of increasing the efficiency of individual system components. Very little improvement has been evidenced in new and improved working fluids. The classic water-steam Rankine cycle is still almost exclusively used in central station power while air and nitrogen are overwhelmingly prevalent in hot gas power plants.

The use of air or nitrogen, or for that matter any non-dissociating gas severely restricts the efficiency and in fact the practicability of a thermodynamic system such as the closed Brayton cycle. Ignoring plant parasitic losses for the purpose of illustration, the net output from a Brayton cycle plant is turbine work minus compressor work. Further, if frictional pressure drop is discounted, the pressure drop through the turbine will be equal to the pressure rise through the compressor. Net work is therefore obtained by the difference in the average specific volume $\overline{V}$ of the hot gas expanding through the turbine $\overline{V}_T$ and the colder gas being compressed in the compressor $\overline{V}_C$; net work therefore equals $\Delta P(\overline{V}_T - \overline{V}_C)$ where $\Delta P$ is the change in pressure. The gas specific volume at constant pressure following the perfect gas law is directly proportional to the absolute temperature for an iso-molecular gas. As a result, the closed Brayton cycle requires a high turbine inlet temperature and is extremely sensitive to individual component (turbine and compressor) efficiency. In a typical closed Brayton cycle power plant using nitrogen as the working fluid and at a turbine inlet temperature of 1200° F., the ratio of turbine work to compressor work is only 1.2/1.0. Plant output is reduced by more than two thirds if the turbine and compressor efficiency are reduced by only 5 points each. Further, if the turbine inlet temperature drops to 1000° F., the net plant output goes to zero. It is easy to see why the closed Brayton cycle has not been used extensively to produce power.

The use of an iso-molecular working fluid in other hot gas thermodynamic cycles, e.g., the Stirling cycle, results in a similar but not as severe limitation on cycle efficiency. It can also be shown that under certain conditions the water-steam working fluid may not be optimum for the Rankine cycle.

The present invention overcomes many of the restrictions and limitations inherent in an iso-molecular working fluid when used in a hot gas thermodynamic cycle.

The basic method for generating energy in accordance with the present invention comprises the steps of: heating a pressurized, thermally dissociative working fluid in an associated state to convert said working fluid to a substantially dissociated state; expanding said substantially dissociated working fluid against a working surface to produce an output of energy and to reduce the temperature of said substantially dissociated working fluid; removing heat from said substantially dissociated working fluid to return said working fluid to a substantially associated state, a portion of said heat removed from said working fluid being utilized to supply a portion of the heat required in heating said pressurized, thermally dissociative working fluid whereby the working fluid is internally regenerated; pressurizing the substantially associated working fluid; and repeating the cycle of steps beginning with the heating of the pressurized working fluid to complete a closed cycle.

The use of a thermally dissociative working fluid in a Brayton cycle markedly increases the ratio of turbine work to compressor work by increasing the ratio of turbine specific volume $\overline{V}_T$ to compressor specific volume $\overline{V}_C$. A similar increase in the ratio of expansion work to compression work is experienced in the Stirling cycle by increasing the ratio of expansion pressure to compression pressure at constant volume. In the Rankine cycle the use of a condensing working fluid which also reversibly thermally dissociates in the gas phase results in high plant efficiency without resorting to feed water heating or low condenser pressure. While there may not be an increase in efficiency compared with the Rankine cycle using a water-steam working fluid which undergoes a simple phase change (liquid-gaseous), the maximum operating pressure of a cycle using a thermally dissociative working fluid is significantly lower and much ancillary equipment is eliminated.

It is therefore an object of this invention to provide a novel means of increasing the efficiency of closed hot gas thermodynamic cycles including a working fluid which dissociates upon heating and reversibly recombines upon cooling.

Another object of this invention is to provide a novel means of reducing the complexity of the Rankine cycle power plant including a condensing working fluid which dissociates upon heating and reversibly recombines upon cooling in the gas phase.

Still another object of this invention is to provide a novel method of internally regenerating a closed cycle power plant operating with a working fluid which is thermally dissociative in the gas phase.

These and other objects, advantages, and features of the present invention will be apparent to those skilled in the art from the following description taken together with the appended drawings, wherein.

It is well known that there are a number of gases which dissociate into simple constituents over a wide range of temperatures. Some of these gases will recombine when cooled so that the dissociation is said to be reversible while other of these dissociative gases will not recombine when cooled so that the dissociation is considered irreversible. It is reversible dissociation which is of interest here.

To illustrate the process of dissociation, consider a molecule of a fictitious gas $X_4Y_2$, containing 4 atoms of element X and 2 atoms of element Y. Further, consider that if the molecule of gas $X_4Y_2$ is heated above 400° C., it breaks up into two molecules of gas $X_2Y$. Further assume that when the two molecules of $X_2Y$ gas are cooled below 400° C., they will recombine into a single molecule of $X_4Y_2$, thus completing a reversible process.

The breaking up of molecule $X_4Y_2$ into two molecules of $X_2Y$ is called dissociation. Since, as in the example, this dissociation was effected by a change in temperature it is further defined as thermal dissociation. This dissociation is to be distinguished from the common change of phase which occurs in many thermodynamic working fluids. A change in phase is defined as a change from one physical state to another physical state without any corresponding change in the chemical composition of the fluid itself. The most common example of a change of phase would be the boiling of water ($H_2O$) to steam ($H_2O$). In the example of dissociation provided above, both the dissociation and recombination (association) occurred in the same phase, namely, as a gas.

The most important single attribute of the thermal dissociation process as it relates to the present invention is the fact that the two molecules of $X_2Y$ occupy a greater specific volume than the single molecule of $X_4Y_2$ at constant pressure. Conversely, if the volume is held constant, an increase in pressure will result.

Figures 1, 2, 3:
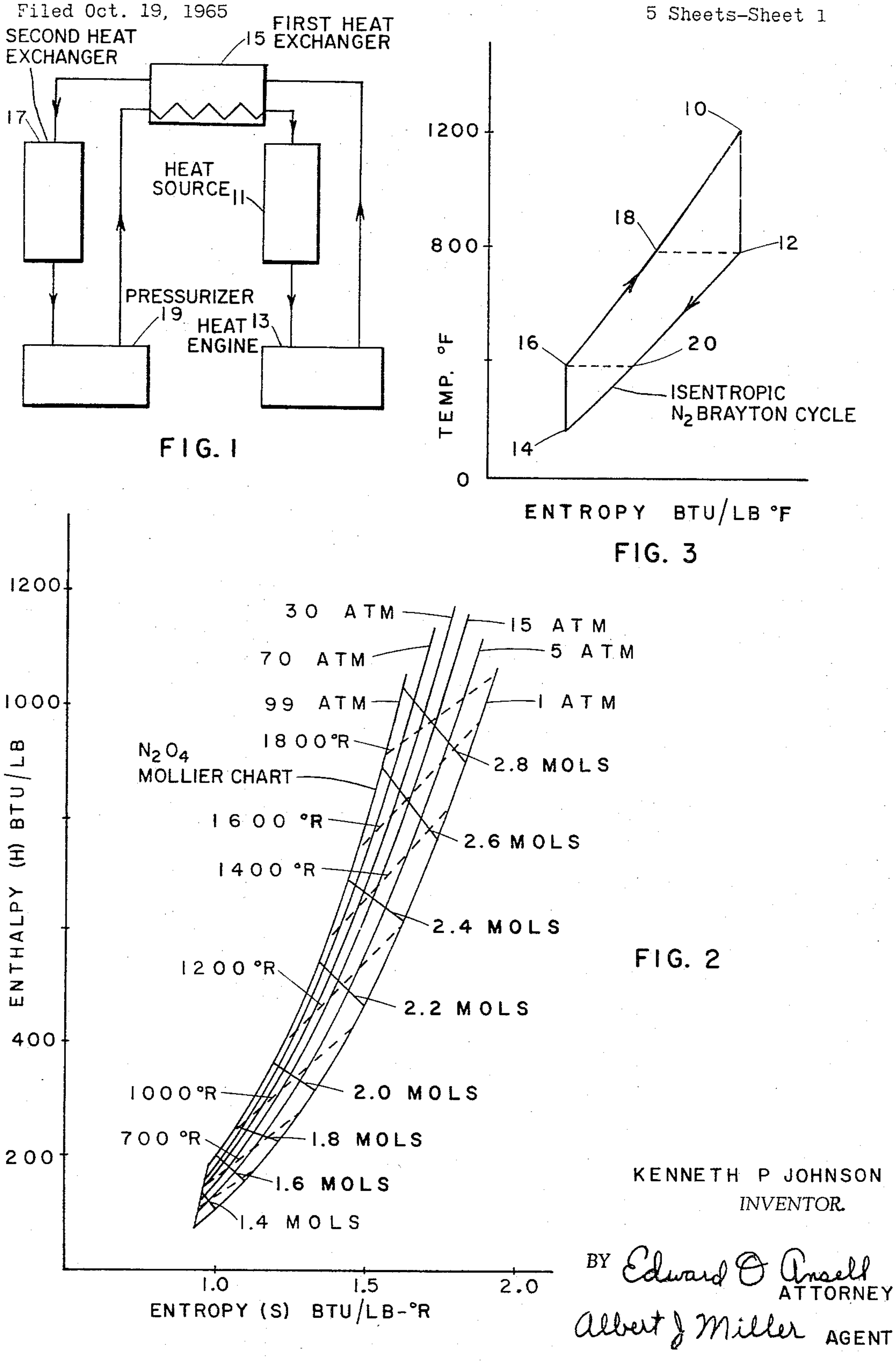
FIGURE 1 is a schematic flow diagram of a basic thermodynamic cycle using a thermally dissociative working fluid.
FIGURE 2 is a Mollier chart for nitrogen tetraoxide ($N_2O_4$) and its dissociative products.
FIGURE 3 is a temperature-entropy diagram of an isentropic nitrogen ($N_2$) Brayton cycle.

Referring to FIGURE 1, there is illustrated a basic thermodynamic cycle capable of efficiently operating on a working fluid which is thermally dissociative in the gas phase. The heat source 11 receives the working fluid in a partially dissociated state and heats the working fluid until it is substantially dissociated. The thermally dissociated working fluid is then expanded against a working surface of the heat engine 13. A first heat exchanger 15 receives the expanded working fluid and removes heat from the working fluid to substantially associate the working fluid. This heat removed from the working fluid by the first heat exchanger 15 is transferred back to the working fluid after the working fluid rejects heat to a second heat exchanger 17 and is increased in pressure by a pressurizer 19. The second heat exchanger 17 in removing heat further associates the working fluid before pressurization. Following this internal transfer of heat in the first heat exchanger 15 the working fluid is returned to the heat source 11 to complete a closed cycle.

The advantages of utilizing a working fluid which is thermally dissociative in the gas phase can best be shown by reference to specific thermodynamic cycles. As previously defined, the network for the ideal Brayton cycle is the difference between the average specific volume of the hot gas expanding through the turbine $\overline{V}_T$ and the average specific volume of the cold gas being compressed in the compressor $\overline{V}_C$ multiplied by the system differential pressure ($\Delta P$). If, however, the gas working fluid dissociates into higher constituents as it is heated, there will be more molecules of gas expanding through the turbine than if the gas did not dissociate. In this manner there is a significant increase in the ratio of $\overline{V}_T$ to $\overline{V}_C$ which increases the ratio of turbine work to compressor work and thereby greatly improves cycle efficiency. In this case net work can be represented as equal to $\Delta P(N_T\overline{V}_T - N_G\overline{V}_C)$ where $N_T$ and $N_C$ are the number of mols passing through the turbine and compressor, respectively. For a non-dissociating or iso-molecular gas $N_T$ will obviously equal $N_C$.

Over the temperature ranges of interest to the Brayton cycle, i.e., turbine inlet temperature=1200° F. (652° C.) and compressor inlet temperature=150° F. (68° C.) there are a number of gases which will thermally dissociate. For purpose of explanation, nitrogen tetraoxide $N_2O_4$ will be used as an example to illustrate the advance made by the present invention.

Ignoring pressure effects, it is well known that between 0 and 140° C. a molecule of nitrogen tetraoxide $N_2O_4$ will dissociate into two molecules of nitrogen dioxide $NO_2$. In fact, at 135° C., 99% of the $N_2O_4$ has dissociated into $NO_2$. Conversely, the 2 molecules of $NO_2$ will recombine when cooled over the same temperature range into a single molecule of $N_2O_4$. Thus, the dissociation is reversible and can be represented as $$N_2O_4 \xrightleftharpoons{0\ 140^\circ\ C.} 2NO_2$$

Additional heating of the $NO_2$ between 150° and 620° C. will result in a further dissociation into nitric oxide and oxygen. As before, this further dissociation is reversible and can be represented as $$2NO_2 \xrightleftharpoons{150^\circ\ 620^\circ\ C.} 2NO + O_2$$

Thus the entire reaction where one mol of $N_2O_4$ is dissociated into 2 mols of nitric oxide + one mol of oxygen gas be represented as $$N_2O_4 \overset{0\text{ }140^\circ\text{ C.}}{\rightleftarrows} 2NO_2 \overset{150^\circ\text{ }620^\circ\text{ C.}}{\rightleftarrows} 2NO + O_2$$

Relating this to the closed Brayton cycle over the temperature range of interest and considering the pressure effects previously ignored, the use of $N_2O_4$ as a working fluid will result in 1.3 mols of gas being compressed but 2.65 mols of gas being expanded.

Referring now to FIGURE 2, there is shown a Mollier chart for the $N_2O_4$ working fluid system based upon an initial charge of one mol of $N_2O_4$. Table 1 shows the constituent breakdown by weight for the molar values shown on the chart.

TABLE 1

[Gas Composition (mols) Related to One Mol of $N_2O_4$ Initially]

| Total Mols | $N_2O_4$ | $NO_2$ | NO | $O_2$ |
|---|---|---|---|---|
| 1.0 | 1.0 | 0 | 0 | 0 |
| 1.2 | 0.8 | 0.4 | 0 | 0 |
| 1.4 | 0.6 | 0.8 | 0 | 0 |
| 1.6 | 0.4 | 1.2 | 0 | 0 |
| 1.8 | 0.2 | 1.6 | 0 | 0 |
| 2.0 | 0 | 2.0 | 0 | 0 |
| 2.2 | 0 | 1.6 | 0.4 | 0.2 |
| 2.4 | 0 | 1.2 | 0.8 | 0.4 |
| 2.6 | 0 | 0.8 | 1.2 | 0.6 |
| 2.8 | 0 | 0.4 | 1.6 | 0.8 |
| 3.0 | 0 | 0 | 2.0 | 1.0 |

Known thermodynamic data was used to determine the equilibrium composition and the enthalpy (H) and entropy (S) for various total pressures and temperatures. The values for a total pressure of one atmosphere were calculated from measured ideal gas values tabulated in the Janaf Thermochemical Tables published by the Dow Chemical Co., Midland, Michigan. Values at other total pressures above 400° K. were calculated by correcting the one-atmosphere data according to the equations below:

$$(\partial H/\partial P)_T=0$$

$$(\partial S/\partial P)_T=-R/P$$

where

H is enthalpy,
P is pressure,
S is entropy,
R is the universal gas constant,
T is temperature.

Values below 400° K. and above one atmosphere were obtained by correcting the ideal values according to van der Vaals equation of state and the following equations:

$$(\partial H/\partial P)_T=V-T(\partial V/\partial T)_P$$

$$(\partial S/\partial P)_T=(\partial V/\partial T)_P$$

where the symbols are as previously defined. This Mollier chart serves as the basis for all of the later calculations made with respect to the $N_2O_4$ working fluid system.

Figure 4:
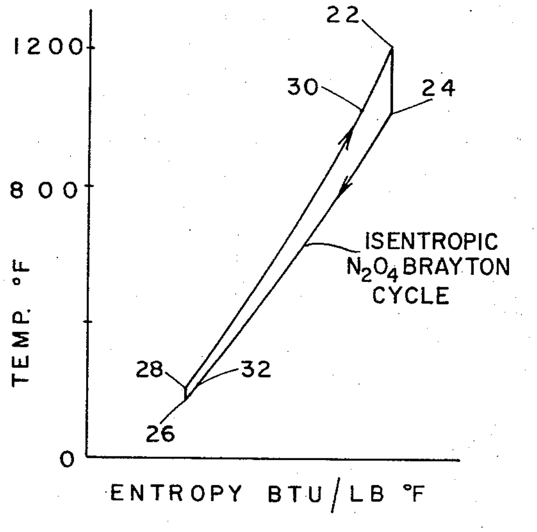
FIGURE 4 is a temperature-entropy diagram of an isentropic nitrogen tetraoxide ($N_2O_4$) Brayton cycle.

Referring now to FIGURES 3 and 4, there is shown an isentropic nitrogen ($N_2$) Brayton cycle temperature-entropy diagram and an isentropic nitrogen tetraoxide ($N_2O_4$) Brayton cycle temperature-entropy diagram, respectively. A turbine inlet temperature of 1200° F. and a compressor inlet temperature of 150° F. was chosen for both cycles. In addition a pressure ratio of three, which is near optimum for a closed regenerated Brayton cycle operating on $N_2$ under the indicated conditions, was selected.

The basic closed Brayton cycle, as illustrated in FIGURE 3 comprises an isentropic expansion, line 10–12, a constant pressure rejection of heat, line 12–14, an isentropic compression, line 14–16, and a constant pressure addition of heat, line 16–10. With ideal regeneration, the temperature at point 18 equals the temperature at point 12 and the temperature at point 20 equals the temperature at point 16. The theoretical thermal efficiency can be calculated from the equation:

$$\eta_{TH}=\frac{W_T-W_C}{\text{Heat In}}=\frac{(h_{10}-h_{12})-(h_{16}-h_{14})}{(h_{10}-h_{18})}$$

where $\eta_{TH}$ is thermal efficiency,
$W_T$ is turbine work,
$W_C$ is compressor work,
$h_{10}$ is the enthalpy at point 10,
$h_{12}$ is the enthalpy at point 12,
$h_{14}$ is the enthalpy at point 14,
$h_{16}$ is the enthalpy at point 16, and
$h_{18}$ is the enthalpy at point 18.

For the $N_2$ Brayton cycle of FIGURE 3, the turbine work is 112.5 B.t.u./lb. and the compressor work is 565 B.t.u./lb. with Heat In of 112.5 B.t.u./lb. for a theoretical thermal efficiency of 49.8%.

Using the same limiting pressure and temperature conditions with respect to the $N_2O_4$ Brayton cycle of FIGURE 4 where cycle points 22, 24, 26, 28, 30, and 32 are equivalent to the corresponding cycle points 10, 12, 14, 16, 18, and 20 of FIGURE 3, the turbine work is calculated to be 95 B.t.u./lb. and the compressor work to be 20 B.t.u./lb. with Heat In of 151 B.t.u./lb. This means that the thermal efficiency is 49.6%. As expected, the theoretical limit on efficiency for these two working fluids are for all intents and purposes the same. The basic difference is, however, in the ratio of turbine work to compressor work. For the $N_2$ Brayton cycle, this ratio is 2, whereas for the $N_2O_4$ Brayton cycle, the ratio is 4.75. The significance of this ratio will be abundantly shown when the working fluids are compared in a Brayton cycle using typical component performances.

Figure 7:
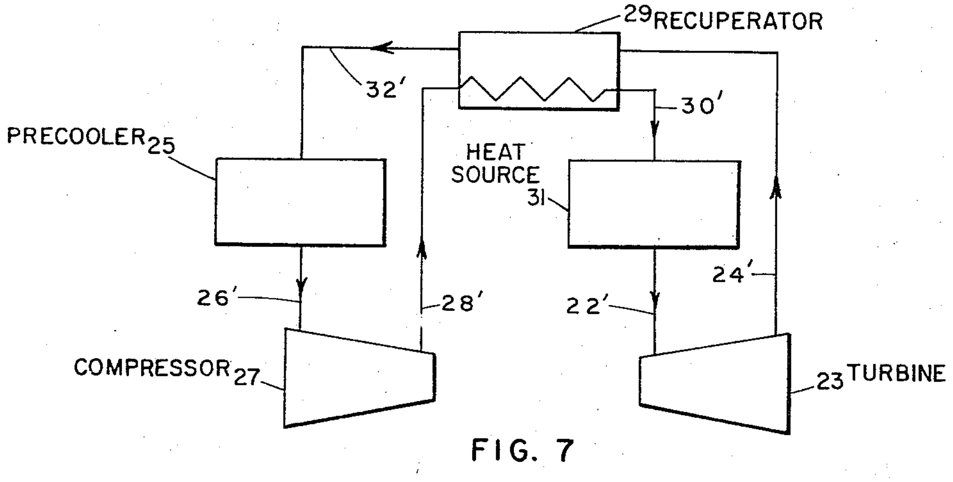
FIGURE 7 is a schematic flow diagram of the practical nitrogen tetraoxide ($N_2O_4$) Brayton cycle of FIGURE 6.
Figure 6:
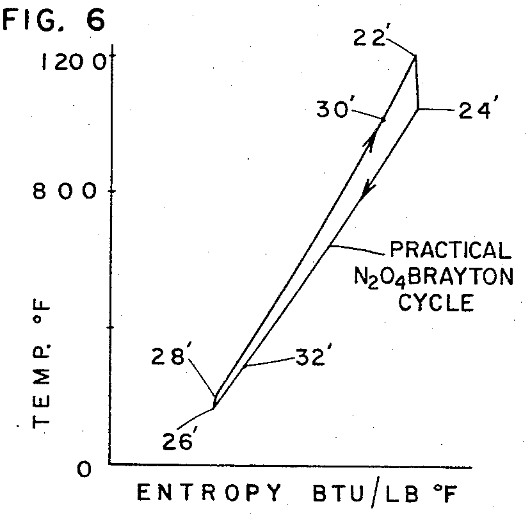
FIGURE 6 is a temperature-entropy diagram of a practical nitrogen tetraoxide ($N_2O_4$) Brayton cycle.
Figure 5:
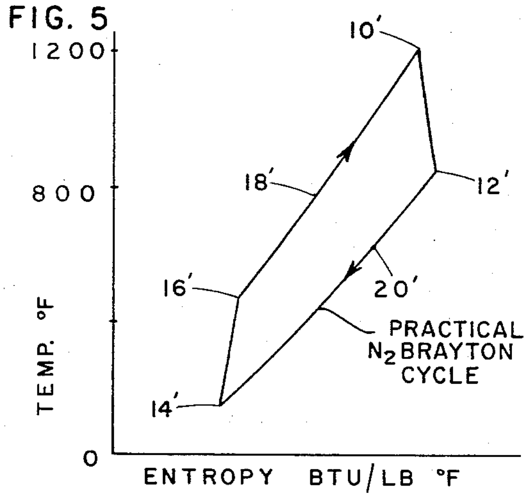
FIGURE 5 is a temperature-entropy diagram of a practical nitrogen ($N_2$) Brayton cycle.

Referring now to FIGURES 5 and 6 there is shown a practical $N_2O_4$ Brayton cycle temperature entropy diagram and a practical $N_2O_4$ Brayton cycle temperature entropy diagram, respectively. The practical $N_2O_4$ Brayton cycle is further illustrated in FIG. 7 which represents a schematic flow diagram for the system. In a simplified schematic form, work is extracted from the cycle between points 22′ and 24′ by an irreversible adiabatic expansion through the turbine 23. A recuperator (heat exchanger) 29 between cycle points 24′ and 32′ extracts heat which is utilized to preheat the working fluid after compression. Heat is rejected from the plant in a precooler 25 to bring the cycle to point 26′. At this point the working fluid is compressed in a compressor 27 to cycle point 28′. Heat is added by the recuperator 29 (to point 30′) and a heat source 31 to complete the closed cycle to point 22′. The $N_2O_4$ is dissociated into $NO+O_2$ during the heating in the heat source 31 and recuperator 29. Association back to $N_2O_4$ occurs in the other side of the recuperator 29 and in the precooler 25.

In FIGURE 5, cycle points 10′, 12′, 14′, 16′, and 20′ correspond to cycle positions 10, 12, 14, 16, 18, and 20 in FIGURE 3. In the same manner, cycle points 22′, 24′, 26′, 28′, 30′, and 32′ correspond to cycle positions 22, 24, 26, 29, 30, and 32 in FIGURE 4. The following typical component efficiencies and system pressure drops were selected for illustration purposes.

Turbine efficiency $\pi T=85\%$
Compressor efficiency $\pi C=80\%$

Frictional pressure drop through low pressure side $\frac{\Delta P}{P}$ (L.P.)=4%

Frictional pressure drop through high pressure side $\frac{\Delta P}{P}$ (H.P.)=8%

$N_2$ recuperator effectiveness=0.8

Further, the gas to gas temperature at the recuperator outlet ($\Delta T_r$) of the $N_2O_4$ system was assumed to be equal to the $N_2$ system or 75° F.

Referring to the $N_2$ system of FIGURE 5, the turbine work is equal to $h_{10'}-h_{12'}$ or 95.6 B.t.u./lb. while the compressor work is equal to $h_{16'}-h_{14'}$ or 79.4 B.t.u./lb. Thus the ratio of turbine work ($W_T$) to compressor work ($W_C$) is 1.2. The thermal efficiency of the system can be shown to be $W_T-W_C/h_{10'}-h_{18'}$ or 14.1%.

Using similar calculations on the $N_2O_4$ system of FIGURE 6, the $W_T$=80.7, $W_C$=27, $W_T/W_B$=3.0 and thermal efficiency=26.2%. If the $\Delta T_r$ at the recuperator is assumed to be 50° F. rather than 75° F., the thermal efficiency will be 29%. In both cases, the cycle efficiency is the plant efficiency related to the turbine shaft output with alternator losses and general plant hotel load not included. Based upon the above analysis, a basic improvement of 35% is indicated by the $N_2O_4$ system. Of equal significance, however, is the fact that the ratio of turbine work to compressor work displayed in the $N_2O_4$ system as compared to the $N_2$ system is 3 to 1.2. Additionally, it can be shown that even reducing the $N_2O_4$ system turbine inlet temperature to 800° F. will result in a thermal efficiency of 15.4%, still higher than the $N_2$ system at a 1200° F. turbine inlet temperature.

Figures 8, 9, 10, 12:
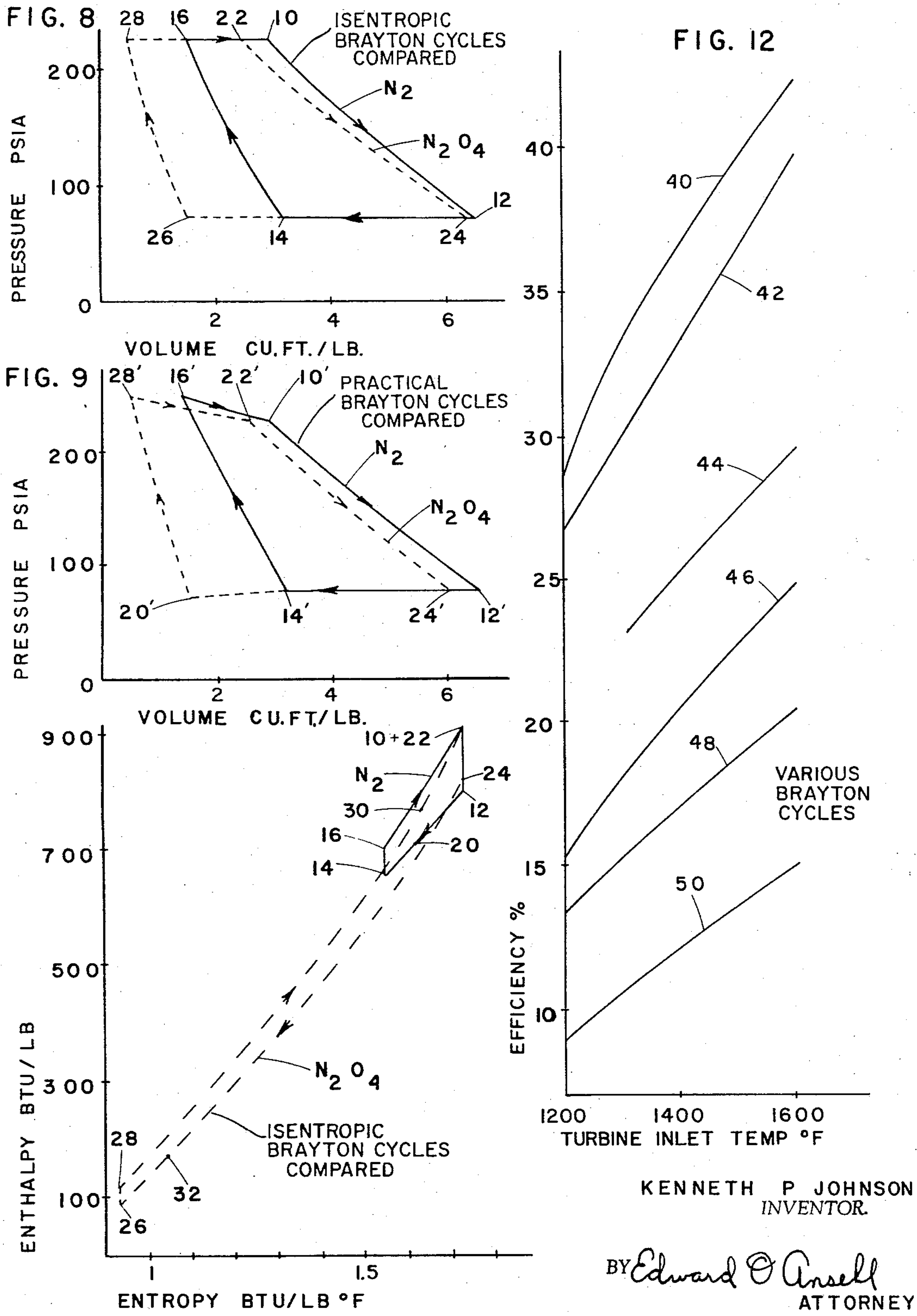
FIGURE 8 is a pressure-volume diagram comparing the isentropic nitrogen ($N_2$) Brayton cycle of FIGURE 3 with the isentropic nitrogen tetraoxide ($N_2O_4$) Brayton cycle of FIGURE 4.
FIGURE 9 is a pressure-volume diagram comparing the practical nitrogen ($N_2$) Brayton cycle of FIGURE 5 with the practical nitrogen tetraoxide ($N_2O_4$) Brayton cycle of FIGURE 6.
FIGURE 10 is an enthalpy-entropy diagram comparing the isentropic nitrogen ($N_2$) Brayton cycle of FIGURE 3 with the isentropic nitrogen tetraoxide ($N_2O_4$) Brayton cycle of FIGURE 4.
FIGURE 12 is a plot of optimum efficiency versus turbine inlet temperature for various Brayton cycles.

In order to further illustrate the effect that is taking place, a pressure-volume (P-V) diagram, FIGURE 8, compares the theoretical $N_2$ system with the theoretical $N_2O_4$ system using the cycle points of FIGURES 3 and 4. FIGURE 9 illustrates the same comparison for the practical cycles using the cycle points of FIGURES 5 and 6. These comparisons amply demonstrate the high ratio of turbine to compressor work that the $N_2O_4$ system bears to the $N_2$ system.

FIGURE 10, an enthalpy-entropy diagram which compares the two isentropic systems indicates the mechanism which results in the superiority of the $N_2O_4$ system. It is evident from this diagram that the thermal energy in the regenerator is used to thermally dissociate the $N_2O_4$ working fluid and cause a significant change in specific volume between the compressor and the turbine. Thus, there is in effect a substitution of thermal dissociation for compressor work.

The net effect is a reduction in the sensitivity of cycle efficiency to the efficiency of the individual cycle components. This is particularly important for a Brayton cycle. An influence analysis was made to demonstrate this effect for the Brayton cycle using the overall cycle conditions of pressure and temperature previously established. The results of the analysis are dramatically shown in Table 2 below. Cycle performance is compared on the basis of a 5% reduction in both turbine and compressor efficiency.

TABLE 2

| | $\eta_T$ (Turbine Efficiency) | $\eta_C$ (Compressor Efficiency) | $\eta_{TH}$ (Thermal Efficiency) |
|---|---|---|---|
| $N_2$ | 85.0 | 80.0 | 14.1 |
| | 80.0 | 75.0 | 4.8 |
| Nitrogen Oxide | 85.0 | 80.0 | 26.2 |
| | 80.0 | 75.0 | 24.9 |

When plant parasitic losses are considered, the effect will be more pronounced than indicated by the above tabulation and in fact the output of the $N_2$ system will go to zero.

Figures 11, 13, 14, 15, 16, 17:
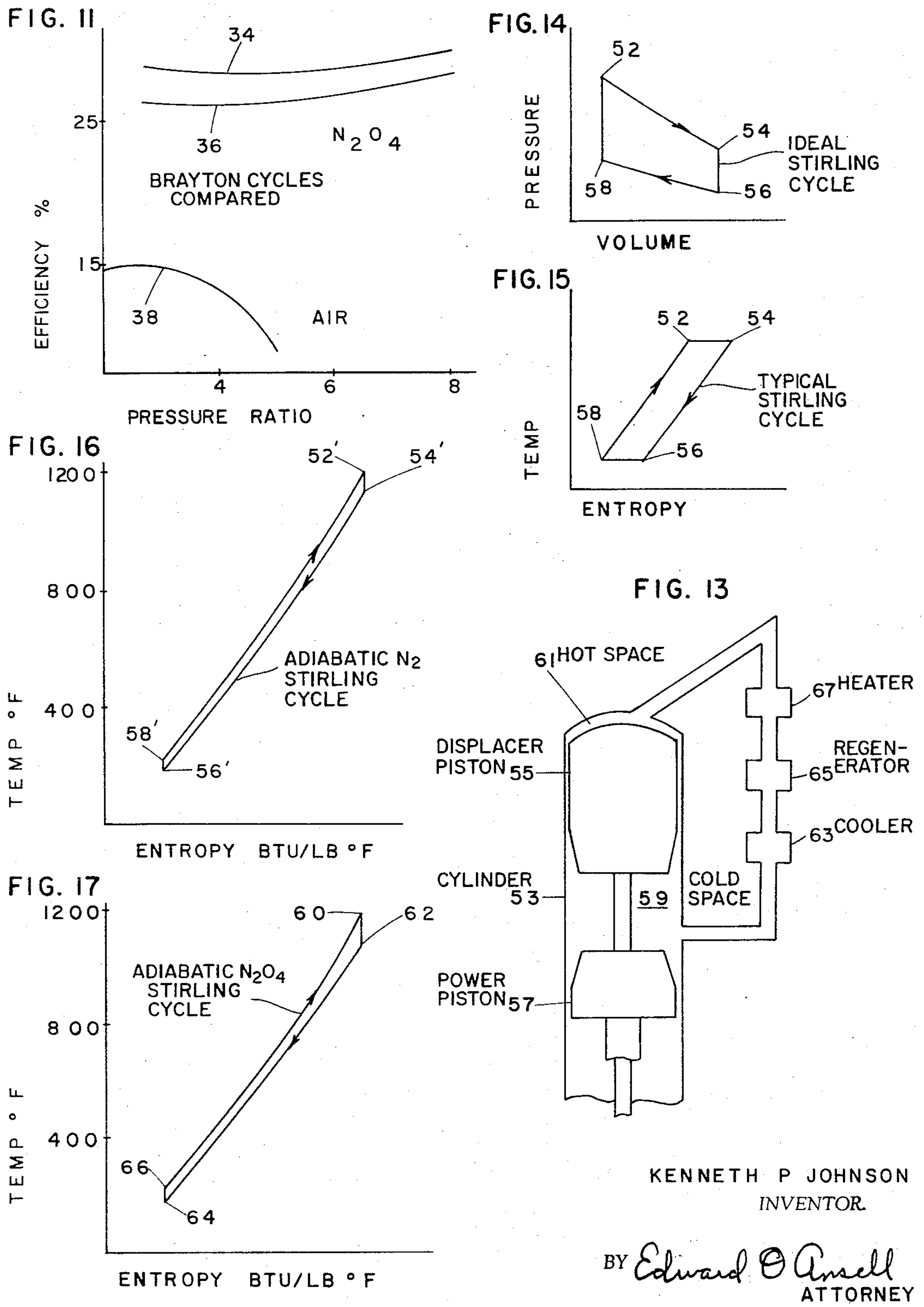
FIGURE 11 is a plot of thermal efficiency versus pressure ratio comparing nitrogen tetraoxide ($N_2O_4$) and air Brayton cycles.
FIGURE 13 is a pressure-volume diagram for an ideal Stirling cycle.
FIGURE 14 is a temperature-entropy diagram for the ideal Stirling cycle of FIGURE 13.
FIGURE 15 is a schematic diagram for a typical Stirling cycle.
FIGURE 16 is a temperature-entropy diagram for an adiabatic nitrogen ($N_2$) Stirling cycle.
FIGURE 17 is a temperature-entropy diagram for an adiabatic nitrogen tetraoxide ($N_2O_4$) Stirling cycle.

Further calculations of the nitrogen oxide Brayton cycle system thermal efficiency were made at various pressure ratios, again using the same component performance ($\eta_T$=85% and $\eta_C$=80%) and inlet temperatures (compressor inlet=150° F. and turbine inlet=1200° F.) as previously employed. The results are illustrated in FIGURE 11. Line 34 represents a curve for the $N_2O_4$ system with a 50° F. gas to gas temperature at the recuperator inlet ($\Delta T_r$) while line 36 is the curve for a 75° F. gas to gas temperature at the recuperator outlet. For comparative purposes, line 38 illustrates the curve for an air Brayton cycle for substantially similar conditions.

The significance of FIGURE 11 is that it illustrates that the $N_2O_4$ is relatively insensitive to the pressure ratio whereas an air (77% nitrogen) system is extremely sensitive to this ratio. For all practical purposes, the thermodynamic performance of a closed air cycle will be equivalent to a closed $N_2$ cycle. This clearly demonstrates for a $N_2O_4$ system that the cycle parameters are not critical and that there is considerable latitude in the selection of component design parameters.

Referring now to FIGURE 12, there is shown a plot of the optimum efficiency of various Brayton cycle systems versus turbine inlet temperatures on the range from 1200° F. to 1600° F. Lines 40 and 42 represent the $N_2O_4$ system with a pressure ratio of 6, at a gas to gas temperature at the recuperator outlet ($\Delta T_r$) of 50° F. and 75° F., respectively. Line 44 represents an air open cycle at a pressure ratio of 4 whereas line 46 is an air closed cycle at a pressure ratio of 3. An air non-regenerative system with a pressure ratio of 8 in an open cycle and a closed cycle is shown by lines 48 and 50, respectively.

Where previous comparison of the $N_2O_4$ closed system with other closed Brayton cycles indicated superior performance, FIGURE 12 indicates the $N_2O_4$ system also compares favorably with open Brayton cycles. The open cycle, which permits the combustion products to pass through the turbine requires a good grade of fuel. A closed system on the other hand permits the burning of lower grade fuels. The $N_2O_4$ system combines high thermodynamic efficiency, even considering furnace effectiveness, at low temperatures together with the acceptability of cheap fuels.

An additional advantage of the $N_2O_4$ system which is independent of the cycle used and actually common to all thermally dissociative working fluids is that the heat transfer of all cycle thermal components is significantly enhanced. Since the gaseous working fluid dissociates as a temperature effect, the laminar flow region adjacent to all heat transfer surfaces which inhibits heat transfer is effectively disrupted by the dissociating gas molecules. Experiments conducted with the dissociation of $N_2O_4$ into $2NO_2$ indicate a potential factor of ten improvement in heat transfer coefficient over non-dissociating gases. This effect is present over the entire temperature range from 0° to 140° C. since the dissociation continues throughout the heating process, e.g., at 21.3° C. the $N_2O_4$ is about twenty percent dissociated into the dioxide.

Likewise, the nitrogen dioxide continues to dissociate up to 620° C. as follows:

| | | | | | |
|---|---|---|---|---|---|
| T.° C. | 130 | 185 | 350 | 500 | 620 |
| Percent dissociated | 0 | 5 | 20 | 57 | 100 |

The $NO_2$ dissociation would thus also be a significant improvement over a nitrogen working fluid.

Having shown how a thermally dissociating gas can significantly improve the performance of a closed Brayton cycle, it can similarly be shown to have the same effect on other thermodynamic cycles.

Referring now to FIGURES 13 and 14, there is illustrated the pressure-volume diagram and temperature entropy diagram respectively for an ideal Stirling cycle. Line 52–54 represents an isothermal expansion where work is extracted, line 54–56 a constant volume cooling wherein heat is given up to a regenerator, line 56–58 is an isothermal compression and line 58–52 a constant volume heating where the heat from the regenerator is returned to the working fluid. Heat is added to the system during the isothermal expansion 52–54 and rejected from the system during the isothermal compression 56–58.

A schematic diagram for a Stirling cycle is shown in FIGURE 15. The basic system comprises a cylinder 53 containing a displacer piston 55 and a power piston 57. The piston positions shown in FIGURE 13 are at the initiation of each process, namely, the displacer piston 55 against the closed end of the cylinder 53 and the power piston 57 at the bottom of its stroke. This corresponds to point 56 of FIGURES 14 and 15.

At this point, the working fluid is principally in the cold space 59 between the pistons 55 and 57. This cold space 59 is connected to the hot space 61 above the displacer piston 55 through a cooler 63, regenerator 65, and heater 67. The volume of the working fluid is changed only by movement of the power piston 57 while movement of the displacer piston 55 will result solely in a change in working fluid temperature.

To go from point 56 to point 57 the power piston 57 is moved from bottom dead center to top dead center thereby compression the working fluid in the cold space 59. Ideally, heat is removed from the working fluid during this process in order to maintain constant pressure.

Moving the displacer piston 55 downward forces the cold working fluid through the cooler 63, regenerator 65, and heater 67 into the hot space 61 and thereby dissociating the fluid. This process, line 58–52 is completed when all of the working fluid has been transferred from the cold space 59 to the hot space 61.

Line 52–54, the power stroke of the cycle, results from the expansion of the hot working fluid acting upon the power piston 57 through the displacer piston 55. Holding the power piston 57 stationary at the bottom of the power stroke and moving the displacer piston 55 upward will complete the cycle. Line 54–56 forces the working fluid through the heater 67, regenerator 65, and cooler 63 and into the cold space 59 whereby recombination or association of the working fluid occurs. Thermal energy is stored in the regenerator 65 during this phase of process.

As a practical matter, however, it has been found in the Stirling cycle that both the expansion 52–54 and compression 56–58 take place more or less adiabatically rather than isothermally. This is primarily due to heat transfer rate limits in the regenerator and through the wall of the heat source and the heat sink. In addition, fluid friction or flow losses, representing the work done in forcing the gas to flow back and forth through the cooler 63, regenerator 65, and heater 67 become greater as machine speed is increased (i.e., compression work is increasing relative to expansion work). In order to reduce internal heat transfer and fluid friction losses, modern Stirling engines are operated on either hydrogen or helium which are both excellent gas heat transfer mediums. To use these gases in a practical machine, however, it is necessary to develop a zero leaking seal around the reciprocating power piston 57.

Referring now to FIG. 16, there is shown an adiabatic Stirling cycle using $N_2$ as a working fluid. Conditions assumed were an expansion inlet temperature of 1200° F. and a compression inlet temperature of 180° F. Ignoring internal friction, the net output of the Stirling engine is expansion work minus compressor work. The volume (V) swept through by the power piston 57 during the expansion stroke is equal to the volume displaced during the compression stroke. Net work is obtained therefore from the difference in average pressure during expansion versus compression. Expressing this in equation form $$\eta_{TH}=\frac{T_{in}-T_{out}}{T_{in}}=\frac{969.5}{1629.5}=59.6\%$$

wherein $\eta_{TH}$=thermal efficiency,
$T_{in}$=average inlet temperature,
$T_{out}$=average rejection temperature.

Figures 18, 19, 20, 21, 22:
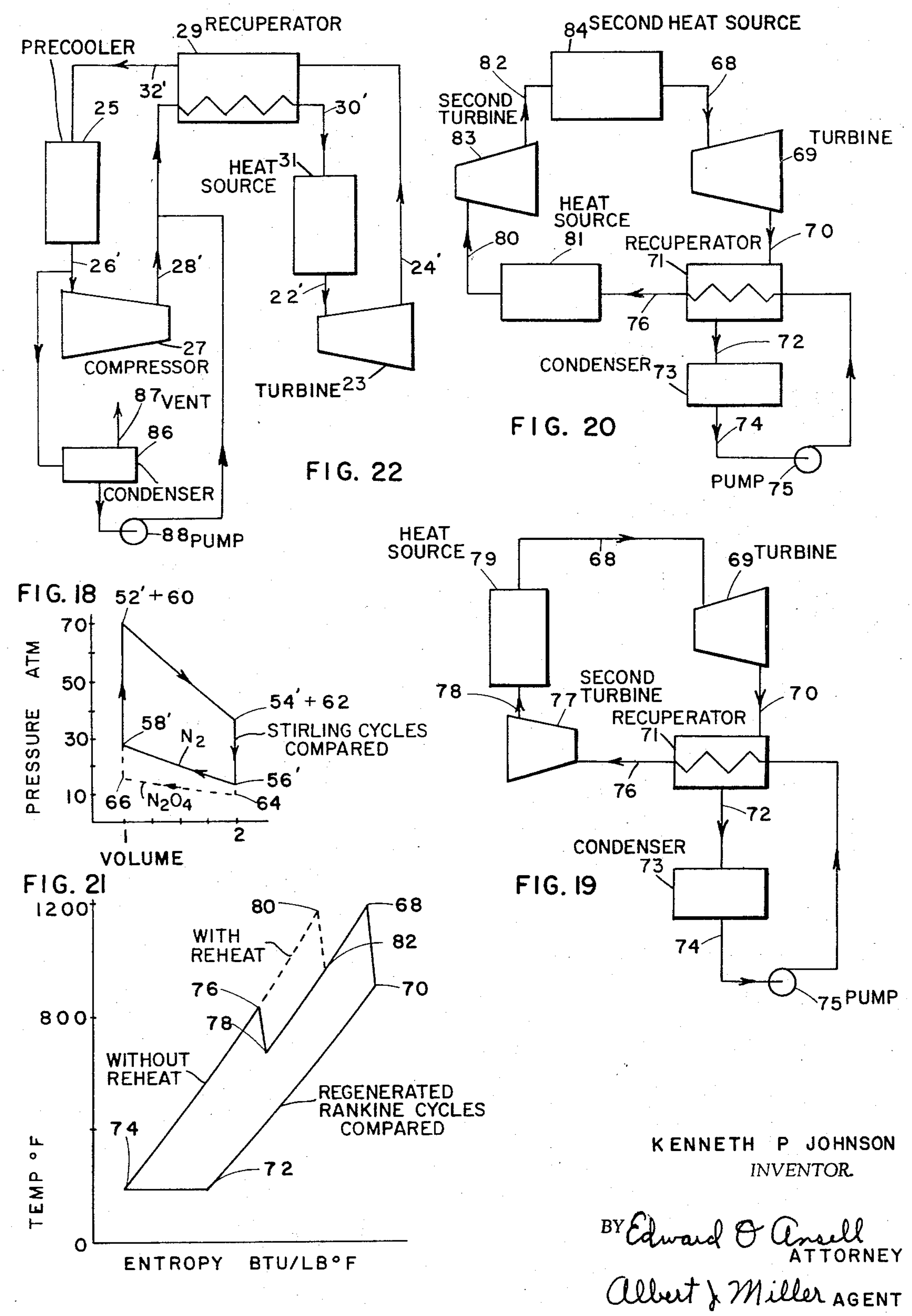
FIGURE 18 is a pressure-volume diagram comparing the nitrogen ($N_2$) Stirling cycle of FIGURE 16 with the nitrogen tetraoxide ($N_2O_4$) Stirling cycle of FIGURE 17.
FIGURE 19 is a schematic flow diagram of a nitrogen tetraoxide ($N_2O_4$) regenerated Rankine cycle without reheat.
FIGURE 20 is a schematic flow diagram of a nitrogen tetraoxide ($N_2O_4$) regenerated Rankine cycle with reheat.
FIGURE 21 is a temperature-entropy diagram for the nitrogen tetraoxide ($N_2O_4$) regenerated Rankine cycles of FIGURES 19 and 20.
FIGURE 22 is a schematic flow diagram of nitrogen tetraoxide ($N_2O_4$) Brayton cycle of FIGURE 6 having a bypass vent.

Use of a thermally dissociating gas as a working fluid will serve to increase the pressure ratio between expansion and compression in this fixed volume regenerative machine since pressure is directly proportional to the number of moles of gas in a fixed volume at constant temperature. The ratio of expansion work to compression work will, therefore, be greater for a thermally dissociative gas as compared with a non-dissociating gas over the same temperature range in a Stirling cycle. This fact is illustrated in FIGURES 16, 17, and 18. FIGURE 17 is a temperature-entropy diagram for an adiabatic Stirling cycle using $N_2O_4$ under identical temperature limits and maximum pressure as shown in FIGURE 16 for $N_2$. Cycle points 60, 62, 64, and 66 in FIGURE 17, correspond to cycle points 52′, 54′, 56′, and 58′ of FIGURE 16. The graphic demonstration however in FIGURE 18 is a pressure-volume diagram showing both working fluid cycles.

While the cycle thermodynamic efficiency for both cycles is essentially, 59.6 to 59%, the average compression stroke pressure is much lower for the nitrogen tetraoxide system. A situation analogous to the effect of using a thermally dissociative gas in the Brayton cycle occurs here also, i.e., the ratio of expansion to compression work is higher using the dissociating gas, that is $$\left(\frac{P_{exp}}{P_{comp}}=\frac{52.5}{21.2}=2.48 \text{ for } H_2 \text{ vs } \frac{P_{exp}}{P_{comp}}=\frac{52.5}{12}=4.4 \text{ for nitrogen tetraoxide}\right)$$

where $P_{exp}$ is average expansion pressure, and
$P_{comp}$ is average compression pressure.

In an actual engine it can thus be expected that frictional losses will have less of an effect on an engine designed for operation with a thermally dissociating gas such as nitrogen tetraoxide.

The problem of sealing the working fluid can also be simplified by using $N_2O_4$ liquid as the system lubricant. $N_2O_4$ is a liquid at 70° F. and one atmosphere pressure. Leakage past the piston can be tolerated if liquid $N_2O_4$ is pumped back to the working fluid side of the piston. As stated previously, a thermally dissociating gas will also exhibit better heat transfer properties than the typical non-dissociating gas which will reduce internal heat transfer losses.

It can further be shown that a thermally dissociative working fluid has advantages even in the Rankine cycle. The Rankine cycle using steam as the working fluid is the most widely used power cycle in use today in the central station power industry. In order to produce high thermodynamic efficiency, the temperature at which heat is added to the cycle must be as high as possible and rejection temperature as low as possible. Steam is condensed at below atmospheric pressure to reduce rejection temperature and steam extraction between turbine stages with feedwater heating is employed to raise the heat addition temperature. Also in order to raise heat addition temperatures and enhance heat transfer, modern steam plants are operated above the critical pressure of steam (3200 p.s.i.a.). Non-condensables leak into the plant on the low pressure side and costly equipment is required for feedwater heating on the high pressure side.

Because a thermally dissociative gas has a high vapor specific heat, it can be considered as a working fluid in a regenerated Rankine cycle power plant. The latent heat of condensation is low relative to vapor specific heat and thus the availability of thermal energy through the regenerator remains high. Condensing the working fluid, pumping it as a liquid and regenerating it back to a gas replaces the compression of the Brayton cycle.

Referring now to FIGURES 19 and 20, there are shown typical Rankine cycle schematic flow diagrams and heat balances for an $N_2O_4$ system without and with reheat, respectively. FIGURE 21 is a temperature-entropy diagram for these Rankine cycles. In these three figures, line 68–70 represents expansion through the turbine 69 to produce a cycle work output. The working fluid then rejects heat, line 70–72, to a recuperator 71 before being condensed, line 72–74 in a condenser 73. A pump 75 raises the pressure of the fluid before the heat rejected to the recuperator 71 is recovered by the pressurized fluid, line 74–76. Up to this point the cycles of FIGURES 19 and 20 are identical but each is now completed in a different manner.

In the non-reheat cycle of FIGURE 19, the fluid, after receiving heat from the recuperator 71 is again expanded through a second turbine 77, as indicated by line 76–78. The cycle is then completed by a heat source 79 which returns the fluid to cycle point 68. For this cycle, the thermal efficiency can be calculated from $$\eta_{TH}=\frac{(h_{68}-h_{70}+h_{76}-h_{78})-W_P}{h_{68}-h_{78}}=40.7\%$$

where $\eta_{TH}$=thermal efficiency,
$h_{68}$ is the entropy at cycle point 68,
$h_{70}$ is the entropy of cycle point 70,
$h_{76}$ is the entropy at cycle point 76.
$h_{78}$ is the entropy at cycle point 78, and
$W_p$ is pump work.

On the other hand, the reheat cycle of FIGURE 20 is closed from cycle point 76 by a heat source 81, a second turbine 83, and a second heat source 84. The reheat work is illustrated by new cycle points 80 and 82 on FIGURE 21. The efficiency of this cycle is calculated as follows:

$$\eta_{TH}=\frac{(h_{80}-h_{82})+(h_{68}-h_{70})-W_P}{(h_{80}-h_{76})+(h_{68}-h_{82})}=46\%$$

where $\eta_{TH}$ is thermal efficiency,
$h_{80}$ is the entropy at cycle point 80,
$h_{82}$ is the entropy at cycle point 82,
$h_{68}$ is the entropy at cycle point 68,
$h_{70}$ is the entropy at cycle point 70,
$h_{76}$ is the entropy at cycle point 76, and
$W_p$ is pump work.

It is thus apparent that the $N_2O_4$ Rankine cycles are on an efficiency par with the conventional steam Rankine cycle. It is equally evident that the $N_2O_4$ cycle can produce this same efficiency at a pressure less than half that required for a steam sysle since a supercritical steam plant is operated at 3500 p.s.i.a. to achieve similar performance. In addition, feedwater heating is eliminated by use of the recuperator and the leakage of non-condensables into the system is avoided because the $N_2O_3$ system condenses above ambient pressure.

$N_2O_4$ which has been used as an illustrative dissociating gas is readily available and inexpensive (12¢/pound). The thermal dissociation and recombination rates over the temperature range of interest are extremely rapid.

The reactions of interest which have previously been pointed out are $N_2O_4 \rightleftharpoons 2NO_2 \rightleftharpoons 2NO+O_2$. At temperatures above 3000° F. the reaction continues on rapidly to $N_2$ and $O_2$ which is irreversible. This irreversible thermal dissociation rate is fortunately low in the temperature range of interest, i.e., 1% conversion in 500 hr. at 1200° F., calculated with the gas at 15 atmospheres and occupying 5% of the loop volume. A 300 kwe. plant with about 50 pounds of gas in it will have about 0.5 pound of gas go to free $N_2$ and $O_2$ in 500 hours.

Since $N_2O_4$ liquifies at 70° F. and one atmosphere of pressure, these "non-condensables" can be removed by a condensing bypass loop around the compressor. As shown in FIGURE 22, a bypass loop of a condenser 86 (having a vent 87) and a pump 88 will constantly scrub a fraction of total loop flow and the excess $N_2$ and $O_2$ can be removed from the system.

While $N_2$ is toxic and forms acid when mixed with water, this can be overcome by a completely sealed system which is free of moisture.

Containment and heat exchanger materials of interest are typically Hastelloy X and Haynes Alloys (trademarks of Haynes-Stellite Corp.). While both are nickel base alloys, Hastelloy X contains more than 20% chromium and substantial amounts of molybdenum and iron while Haynes Alloys are distinguished by their high cobalt content. Note that the presence of free oxygen at the high temperature end will promote formation of oxide films on high temperature components. Experience with Hastelloy X in oxidizing atmospheres has shown that a buildup of a protective oxide surface layer is beneficial.

While $N_2O_4$ has been used as an example throughout this application and considerable information has been advanced concerning it, there are many other thermally dissociative gases which could perform well in this invention. Among these are: $I_2$, $PCl_5$, NBr, $S_2Cl_2$, BrF, ClF, $ClF_3$, IF, NOCl.

Each of these working fluids have a positive free energy change of less than 10 Kcal./gram mol at 298° K. They are gaseous over the temperature range between 290° K. to 1300° K. and exhibit a rapid reversible thermal dissociation.

It should be recognized that there are other thermodynamic cycles wherein a thermally dissociative working fluid would exhibit the same advantages as in the cycles discussed above. Alternates and equivalents will occur to those skilled in the art which are within the spirit and scope of this invention. It is therefore desired that protection not be limited to the details illustrated and described but only by the proper scope of the appended claims.

What is claimed is:

1. An improved power plant having a closed system comprising:

(a) a working fluid which is reversibly thermally dissociative in the gas phase;

(b) a heat source to receive said working fluid in a partially dissociated state and to raise the temperature level of the working fluid whereby the working fluid further dissociates into its constituent molecules;

(c) a heat engine operably associated with said heat source to receive said substantially dissociated working fluid from said heat source and to produce an output of energy by expanding said working fluid against a working surface;

(d) a first heat exchanger having a low pressure side operably associated with said heat engine to receive said expanded working fluid from said heat engine and to transfer thermal energy to the working fluid of the high pressure side of said heat exchanger, whereby said expanded working fluid is reduced in temperature and substantially associated into its primary molecular form;

(e) a second heat exchanger operably associated with the low pressure side of said first heat exchanger to receive said substantially associated said working fluid from said first heat exchanger to reject thermal energy from said working fluid, to further reduce the temperature of said working fluid and further associate said working fluid;

(f) a pressurizer operably associated with said second heat exchanger to raise the pressure of said associated working fluid;

(g) said high pressure side of said first heat exchanger operably associated with said pressurizer to receive said pressurized working fluid from said pressurizer and to receive the thermal energy from the low pressure side of said first heat exchanger, whereby said pressurized working fluid is raised in temperature and at least partially dissociated into its constituent molecules; and (h) said high pressure side of said first heat exchanger also operably associated with said heat source to return said partially dissociated working fluid to said heat source and thereby complete the closed system of the power plant.

2. The improved power plant of claim 1 wherein the working fluid is selected from the following gases: $N_2O_4$, $I_2$, $PCl_5$, NBr, $S_2Cl_2$, BrF, ClF, $ClF_3$, IF, and NOCl.

3. A method for generating energy comprising the steps of:

(a) heating a pressurized, thermally dissociative working fluid in a substantially associated state to convert said working fluid to a substantially dissociated state;

(b) expanding said substantially dissociated working fluid against a working surface to produce an output of energy and to reduce the temperature of said substantially dissociated working fluid;

(c) removing heat from said substantially dissociated working fluid to return said working fluid to a substantially associated state, a portion of said heat removed from said working fluid being utilized to supply a portion of the heat required in step (a) whereby the working fluid is internally regenerated;

(d) pressurizing the substantially associated working fluid; and (e) repeating the cycle of steps beginning with the heat-of the pressurized working fluid.

4. An improved power plant having a closed system comprising:

(a) a working fluid which is reversibly thermally dissociative in the gas phase;

(b) a heat source to receive said working fluid in a partially dissociated state and to raise the temperature level of the working fluid whereby the working fluid further dissociates into its constituent molecules;

(c) a heat engine operably associated with said heat source to receive said substantially dissociated working fluid from said heat source and to produce an output of mechanical energy by expanding said working fluid against a working surface;

(d) a recuperator having a low pressure side operably associated with said heat engine to receive said expanded working fluid from said heat engine and to transfer thermal energy to the working fluid of the high pressure side of said recuperator, whereby said expanded working fluid is reduced in temperature and substantially associated into its primary molecular form;

(e) a precooler operably associated with the low pressure side of said recuperator to receive said substantially associated working fluid from said recuperator to reject thermal energy from said working fluid to further reduce the temperature of said working fluid and thereby further associate said working fluid;

(f) a compressor operably associated with said precooler to receive said associated working fluid from said precooler to raise the pressure of said associated working fluid;

(g) said high pressure side of said recuperator operably associated with said compressor to receive pressurized working fluid from said compressor and to receive the thermal energy from the low pressure size of said recuperator, whereby said pressurized working fluid is raised in temperature and at least partially dissociated into its constituent molecules; and (h) said high pressure size of said recuperator also operably associated with said heat source to return said partially dissociated working fluid to said heat source and thereby complete the closed system of the power plant.

5. A method for generating energy comprising the steps of:

(a) heating a pressurized, thermally dissociative working fluid in a substantially associated state to convert said working fluid to a substantially dissociated state;

(b) expanding said substantially dissociated working fluid against a working surface to produce an output of mechanical energy and reducing the temperature of said substantially dissociated working fluid;

(c) removing heat from said substantially dissociated working fluid to return said working fluid to a substantially associated state, a portion of said heat removed from said working fluid being utilized to supply a portion of the heat required in step (a) whereby the working fluid is internally regenerated;

(d) compressing the substantially associated working fluid; and (e) repeating the cycle of steps beginning with the heat-of the pressurized working fluid.

6. An improved power plant having a closed system comprising:

(a) a working fluid which is reversibly thermally dissociative in the gas phase;

(b) a heat source to receive said working fluid in a gaseous partially dissociated state and to raise the temperature level of the working fluid whereby the working fluid further dissociates into its constituent molecules;

(c) a heat engine operably associated with said heat source to receive said substantially dissociated working fluid from said heat source and to produce an output of mechanical energy by expanding said working fluid against a working surface;

(d) a regenerator having a low pressure side operably associated with said heat engine to receive said expanded working fluid from said heat engine and to transfer thermal energy to the working fluid of the high pressure side of said regenerator, whereby said expanded working fluid is reduced in temperature and substantially associated into its primary molecular form;

(e) a condenser operably associated with the low pressure side of said regenerator to receive said substantially associated working fluid from said regenerator to reject thermal energy from said working fluid to further reduce the temperature of said working fluid, further associate said working fluid and condense said working fluid to a liquid state;

(f) a pump operably associated with said condenser to receive said liquid associated working fluid from said condenser to raise the pressure of said associated working fluid;

(g) said high pressure side of said regenerator operably associated with said pump to receive said pressurized working fluid from said pump and to receive the thermal energy from the low pressure side of said regenerator, whereby said pressurized working fluid is raised in temperature to a gaseous state and at least partially dissociated into its constituent molecules; and (h) said high pressure side of said regenerator also operably associated with said heat source to return said partially dissociated gaseous working fluid to said heat source and thereby complete the closed system of the power plant.

7. A method for generating energy comprising the steps of:

(a) heating a pressurized, thermally dissociative work-fluid in a substantially associated liquid state to convert said working fluid to a substantially dissociated gaseous state;

(b) expanding said substantially dissociated gaseous working fluid against a working surface to produce an output of mechanical energy and reducing the temperature of said substantially dissociated gaseous working fluid;

(c) removing heat from said substantially dissociated gaseous working fluid to return said working fluid to a substantially associated state and condense said working fluid to a liquid state, a portion of said heat removed from said working fluid being utilized to supply a portion of the heat required in step (a) whereby the working fluid is internally regenerated;

(d) pressurizing the liquid working fluid; and (e) repeating the cycle of steps beginning with the heating of the pressurized liquid working fluid.

8. A method for generating energy comprising the steps of:

(a) heating a pressurized, thermally dissociative working fluid in an associated state to convert said working fluid to a substantially dissociated state;
(b) expanding said substantially dissociated working fluid in a reciprocating power piston to produce an output of mechanical energy and reducing the temperature of said substantially dissociated working fluid;
(c) removing heat from said substantially dissociated working fluid to return said working fluid to a substantially associated state, a portion of said heat removed from said working fluid being utilized to supply a portion of the heat required in step (a) whereby the working fluid is internally regenerated;
(d) pressurizing the substantially associated working fluid in a constant volume device which raises and lowers the gross system pressure by alternately heating and cooling a principal portion of the working fluid in synchronism with said reciprocating power piston of step (b);
(e) repeating the cycle of steps beginning with the heating of the pressurized working fluid.

9. An improved power plant having a closed system comprising:

(a) a working fluid of nitrogen tetraoxide in its primary molecular form;
(b) a heat source to receive said working fluid in a gaseous partially dissociated nitrogen dioxide state and to raise the temperature level of the working fluid whereby the working fluid further dissociates into its basic constituent molecules of nitric oxide and molecular oxygen;
(c) a turbine operably associated with said heat source to receive said substantially nitric oxide and oxygen working fluid from said heat source and to produce an output of mechanical energy by expanding said working fluid against a working surface;
(d) a regenerator having a low pressure side operably associated with said turbine to receive said expanded working fluid from said turbine and to transfer thermal energy to the working fluid of the high pressure side of said regenerator, whereby said expanded working fluid is reduced in temperature and substantially associated into its intermediate molecular form of nitrogen dioxide;
(e) a condenser operably associated with the low pressure side of said regenerator to receive said substantially nitrogen dioxide working fluid from said regenerator to reject thermal energy from said working fluid to further reduce the temperature of said working fluid and further associate said working fluid into its primary molecular form of nitrogen tetraoxide and condense said working fluid to a liquid state;
(f) a pump operably associated with said condenser to receive said liquid nitrogen tetraoxide working fluid from said condenser to raise the pressure of said associated working fluid;
(g) said high pressure side of said regenerator operably associated with said pump to receive said pressurized nitrogen tetraoxide working fluid from said pump and to receive the thermal energy from the low pressure side of said regenerator, whereby said pressurized nitrogen tetraoxide working fluid is raised in temperature to a gaseous state and substantially dissociated into its intermediate constituent molecular form of nitrogen dioxide; and
(h) said high pressure side of said regenerator also operably associated with said heat source to return said gaseous nitrogen dioxide working fluid to said heat source and thereby complete the closed system of the power plant.

10. An improved power plant having a closed system comprising:

(a) a working fluid of nitrogen tetraoxide in its primary molecular form;
(b) a heat source to receive said working fluid in a partially dissociated nitrogen dioxide state and to raise the temperature level of the working fluid whereby the working fluid further dissociates into its basic constituent molecules of nitric oxide and molecular oxygen;
(c) a turbine operably associated with said heat source to receive said substantially nitric oxide and oxygen working fluid from said heat source and to produce an output of mechanical energy by expanding said working fluid against a working surface;
(d) a recuperator having a low pressure side operably associated with said turbine to receive said expanded working fluid from said turbine and to transfer thermal energy to the working fluid of the high pressure side of said recuperator, whereby said expanded working fluid is reduced in temperature and substantially associated into its intermediate molecular form of nitrogen dioxide;
(e) a precooler operably associated with the low pressure side of said recuperator to receive said substantially nitrogen dioxide working fluid from said recuperator to reject thermal energy from said working fluid to further reduce the temperature of said working fluid and further associate said working fluid into its primary molecular form of tetraoxide;
(f) a compressor operably associated with said precooler to receive said associated nitrogen tetraoxide working fluid from said precooler to raise the pressure of said associated working fluid;
(g) said high pressure side of said recuperator operably associated with said compressor to receive said pressurized nitrogen tetraoxide working fluid from said compressor and to receive the thermal energy from the low pressure side of said recuperator, whereby said pressurized nitrogen tetraoxide working fluid is raised in temperature and substantially dissociated into its intermediate constituent molecular form of nitrogen dioxide; and
(h) said high pressure side of said recuperator also operably associated with said heat source to return said nitrogen dioxide working fluid to said heat source and thereby complete the closed system of the power plant.

References Cited

UNITED STATES PATENTS

| | | | |
|---|---|---|---|
| 2,963,853 | 12/1960 | Wescott | 60—36 X |
| 3,195,304 | 7/1965 | Stern et al. | 60—36 |

EDGAR W. GEOGHEGAN, *Primary Examiner.*